(12) United States Patent
Dejean et al.

(10) Patent No.: US 8,302,002 B2
(45) Date of Patent: Oct. 30, 2012

(54) STRUCTURING DOCUMENT BASED ON TABLE OF CONTENTS

(75) Inventors: Herve Dejean, Grenoble (FR); Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 2252 days.

(21) Appl. No.: 11/116,100

(22) Filed: Apr. 27, 2005

(65) Prior Publication Data
US 2006/0248070 A1 Nov. 2, 2006

(51) Int. Cl.
*G06F 17/00* (2006.01)
(52) U.S. Cl. ......................................... 715/256; 715/234
(58) Field of Classification Search .......... 715/234–236, 715/239, 256
See application file for complete search history.

(56) References Cited

U.S. PATENT DOCUMENTS

| | | | |
|---|---|---|---|
| 5,434,962 A | 7/1995 | Kyojima et al. | |
| 5,491,628 A | 2/1996 | Wakayama et al. | |
| 6,199,098 B1* | 3/2001 | Jones et al. | 709/203 |
| 6,298,357 B1 | 10/2001 | Wexler et al. | |
| 6,487,566 B1 | 11/2002 | Sundaresan | |
| 6,490,603 B1 | 12/2002 | Keenan et al. | |
| 6,519,597 B1* | 2/2003 | Cheng et al. | 707/10 |
| 6,546,406 B1* | 4/2003 | DeRose et al. | 715/234 |
| 2002/0083096 A1* | 6/2002 | Hsu et al. | 707/513 |
| 2002/0143818 A1 | 10/2002 | Roberts et al. | |
| 2003/0018629 A1* | 1/2003 | Namba | 707/3 |
| 2003/0093760 A1 | 5/2003 | Suzuki et al. | |
| 2003/0135520 A1* | 7/2003 | Mitchell et al. | 707/200 |
| 2003/0208502 A1 | 11/2003 | Lin | |
| 2004/0003028 A1 | 1/2004 | Emmett et al. | |
| 2004/0024780 A1* | 2/2004 | Agnihotri et al. | 707/104.1 |
| 2004/0181554 A1* | 9/2004 | Heckerman et al. | 707/104.1 |
| 2004/0205461 A1 | 10/2004 | Kaufman et al. | |
| 2005/0278633 A1* | 12/2005 | Kemp | 715/713 |
| 2006/0047682 A1* | 3/2006 | Black et al. | 707/102 |
| 2007/0125859 A1* | 6/2007 | Alleshouse | 235/462.01 |
| 2008/0040347 A1* | 2/2008 | Potok et al. | 707/6 |

OTHER PUBLICATIONS

Adler, S., et al., "Extensible stylesheet language (XSL), Version 1.0," W3C 2001, http://www.w3.org/TR/2001/REC-xsl-20011015/.

Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.

Anjewierden, A., "AIDAS: Incremental logical structure discovery in PDF documents", Proceedings of the International Conference on Document Analysis and Recognition (ICDAR), Seattle, 2001.

(Continued)

*Primary Examiner* — Doug Hutton, Jr.
(74) *Attorney, Agent, or Firm* — Fay Sharpe LLP

(57) ABSTRACT

A document is organized as a plurality of nodes associated with a table of contents. The nodes are clustered into a plurality of clusters based on a similarity criterion. One of the clusters is identified as corresponding to a highest or lowest level of the table of contents based on a selection criterion. The highest or lowest level is assigned to the nodes belonging to the identified cluster. The identifying and assigning are repeated to assign levels to the nodes belonging to each next highest or lowest level of the table of contents. The repeated identifying is based on the selection criteria applied disregarding nodes that have already been assigned a level. The document is structured based at least in part on the levels assigned to the table of contents nodes.

19 Claims, 7 Drawing Sheets

OTHER PUBLICATIONS

Belaïd, A., Pierron, L., Valverde, N., "Part-of-speech tagging for table • of contents recognition", International Conference on Pattern Recognition (ICPR 2000), vol. 4, Sep. 3-8, 2000 Barcelona, Spain.

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analyisis*, World Scientific Publishing Company, 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, Worls Scientific Publishing Company, 1997, pp. 421-456.

Klink, S., Dengel, A., Kieninger, T., "Document structure analysis based on layout and textual features", Poroceedings of Fourth IAPR International Workshop on Document Analysis Systems, DAS 2000, Rio de Janeiro, Brazil, 2000, pp. 99-111.

U.S. Appl. No. 11/032,814, filed Jan. 10, 2005, Dejean et al.
U.S. Appl. No. 11/032,817, filed Jan. 10, 2005, Dejean et al.
U.S. Appl. No. 11/033,016, filed Jan. 10, 2005, Dejean et al.
U.S. Appl. No. 10/756,313, filed Jan. 14, 2004.

Lin, C.C., Niwa, Y., Narita, S., "Logical structure analysis of book document images using contents of information", 4th International Conference on Document Analysis and Recognition (ICDAR'97), Ulm, Germany, Aug. 1997, pp. 1048, 1054.

Lin, X., "Header and footer extraction by p.-association", Hewlett-Packard Company Technical Report, 2002, www.hpl.hp.com/techreports/2002/hpl-2002-129.pdf .

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-24, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting Pdf files into XML", *CambridcieDocs*, 2004, www.cambridgedocs.com.

Mandal et al., "Automated Detection and Segmentation of Table of Contents Page from Document Images," Seventh International Conference on Document Analysis and Recognition, 2003.

Tsuruoka et al., "Image-based Structure Analysis for a Table of Contents and Conversion to XML Documents," In Workshop on document layout interpretation and its application (DLIA 2001), Seattle, Washington, 2001.

Jain et al., "Data Clustering: A Review," ACM Computing Survey, vol. 31, pp. 264-323, 1999.

* cited by examiner

STRUCTURING DOCUMENT BASED ON TABLE OF CONTENTS

INCORPORATION BY REFERENCE

The following commonly assigned applications: Systems and Methods for Converting Legacy and Projecting Documents into Extended Markup Language Format (Ser. No. 10/756,313 filed Jan. 14, 2004 and since issued as U.S. Pat. No. 7,165,216); Method and, Apparatus for Detecting a Table of Contents and Reference determination (Xerox ID 20040274-US-NP, Ser. No. 11/032,814 filed Jan. 10, 2005); Method and Apparatus for Detecting Pagination Constructs Including a Header and a Footer in Legacy Documents (Xerox ID 20040273-US-NP, Ser. No. 11/032,817 filed Jan. 10, 2005 and since issued as U.S. Pat. No. 7,937,653); Method and Apparatus for structuring Documents Based on Their Layout, Content and Collection (Xerox ID 20031509-US-NP, Ser. No. 11/033,016 filed Jan. 10, 2005 and since issued as U.S. Pat. No. 7,693,848); are herein incorporated by reference.

BACKGROUND

The following relates to the information storage and processing arts. It finds particular application in conjunction with converting and cataloging legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

Legacy document conversion relates to converting unstructured documents existing in formats such as Adobe portable document format (pdf), various text formats, various word processing formats, and so forth into structured documents employing a markup language such as XML, SGML, HTML, or so forth. In structured documents, content is organized into delineated structural nodes each containing a section of text, figures, tables, or so forth. The lowest level, or leaves, of the structure typically corresponds to sentences, text blocks, or the like, while higher levels delineate nested, tree-like, or otherwise-organized groupings of nodes. Document structure typically is implemented using markup tags interspersed through the document. In some structured document formats such as XML, a document type definition (DTD) or similar dedicated document portion provides structural information about the document.

There is interest in converting unstructured documents to a structured format. The motivations for converting documents are diverse, including for example: intent to reuse or repurpose parts of the documents; desire for document uniformity across a database of information store; facilitating document searches; and so forth. Initial conversion usually involves breaking the unstructured document into text fragments or other low-level structures, for example delineated by sentences, physical text lines, or other natural breaks in the document. Such a conversion produces an XML or other "structured" document, which however does not include logical structure associated with the semantic content of the document.

One way to introduce a logical structure into the converted document is to make use of the table of contents, if one is available. Unstructured documents often contain the text of a table of contents which provides a natural logical organization or framework for the content of the converted document. In "Method and Apparatus for Detecting a Table of Contents and Reference determination (Xerox ID 20040274-US-NP, Ser. No. 11/032,814 filed Jan. 10, 2005), which is herein incorporated by reference, some suitable techniques are disclosed for extracting a table of contents from a converted document. The document with the extracted table of contents information is organized as a plurality of nodes with corresponding entries of a table of contents. However, the extracted table of contents is "flat"; that is, if the table of contents includes hierarchal levels, such as chapters, sub-chapter sections, or so forth, this hierarchy is not extracted.

Techniques have been developed to reconstruct the table of contents hierarchy, using for example the ordinal numbers associated with the table of contents or section headings, or using other a priori knowledge of the expected hierarchal structure of the table of contents. These techniques are difficult to generalize to a generic hierarchal table of contents that may not include the requisite ordinal numbers or other a priori-known information. Other techniques reconstruct hierarchy based on the physical layout of the document, such as heading fonts, capitalization, or indentation levels. for example, capitalized table of contents entries are likely to be higher up in the hierarchy than entries written in lowercase. Again, these techniques may fail where the table of contents does not employ the requisite formatting. Moreover, the ordinal numbering, physical layout information, and so forth relied upon by these techniques for hierarchal reconstruction is sometimes lost or corrupted in the conversion from the unstructured document to the converted XML or other tagged document.

BRIEF DESCRIPTION

In accordance with aspects of some embodiments, a method is provided for structuring a document organized as a plurality of nodes associated with a table of contents. The nodes are clustered into a plurality of clusters based on a similarity criterion. One of the clusters is identified as corresponding to a highest or lowest level of the table of contents based on a selection criterion. The highest or lowest level is assigned to the nodes belonging to the identified cluster. The identifying and assigning are repeated to assign levels to the nodes belonging to each next highest or lowest level of the table of contents. The repeated identifying is based on the selection criteria applied disregarding nodes that have already been assigned a level. The document is structured based at least in part on the levels assigned to the table of contents nodes.

In accordance with aspects of some embodiments, a method is provided for reconstructing a table of contents hierarchy. Nodes associated with a table of contents are clustered into a plurality of clusters based on a similarity criterion. The nodes of each cluster are assigned to a level of the table of contents corresponding to that cluster. The assigned levels of the nodes are validated. A remedial action is taken responsive to a validation failure.

In accordance with aspects of some embodiments, an apparatus is disclosed for structuring a document. A nodes clustering module clusters nodes of the document associated with a table of contents into a plurality of clusters based on a similarity criterion. A terminal level cluster identifier identifies one of the clusters as corresponding to a highest or lowest level of the table of contents based on a selection criterion. An assignor assigns the highest or lowest level to the nodes belonging to the identified cluster. An iterator iteratively applies the terminal level cluster identifier and the assignor to assign levels to the nodes belonging to each next highest or lowest level of the table of contents. The iterating is based on the selection criteria being applied disregarding nodes that have already been assigned a level.

DETAILED DESCRIPTION

Figure 1:
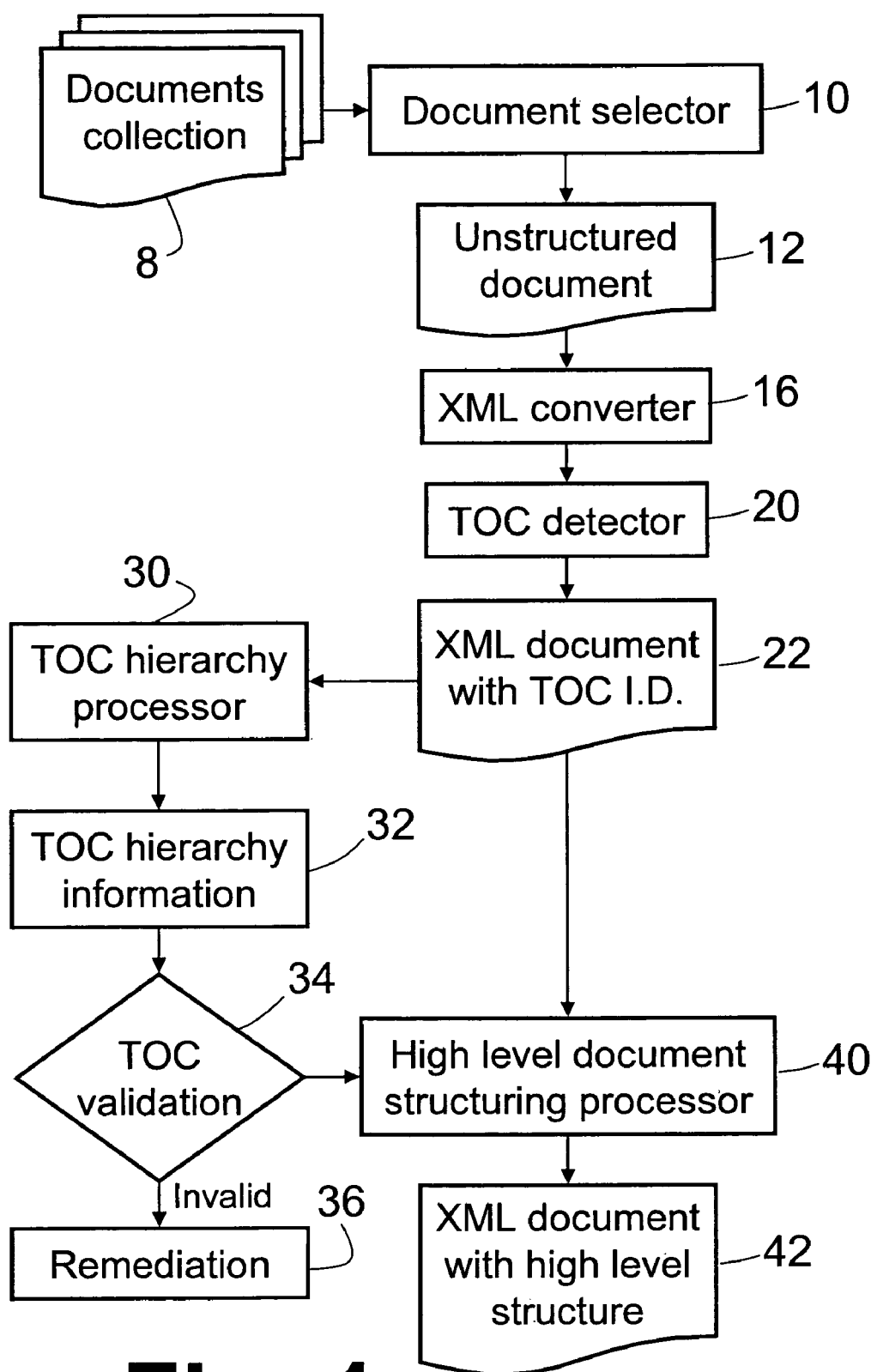
FIG. 1 diagrammatically shows a documents structuring system.

With reference to FIG. 1, a document collection 8 is to be converted to a structured format such as XML, SGML, HTML, or so forth, including high-level structure provided by tables of contents of the documents. A document selector 10 selects an unstructured document 12 from the collection 8 for processing. The unstructured document 12 may be in Adobe pdf format, Microsoft Word format, or another unstructured format. An XML converter 16 converts the unstructured document 12 into a structured XML format. One suitable pdf-XML converter is available from Cambridge-Docs, Boston, Mass., USA; however, other converters can be used. Moreover, the conversion can be from another source document format, such as text or so forth, and/or to another structured format, such as SGML, HTML, or so forth. The document converter 16 produces a "structured" document comporting with the XML standard and including tagged text fragments, figures, tables, or other low level tagged structure. However, the converted document does not include the logical structure provided by the table of contents. The converted document output by the document converter 16 typically has a substantially "flat" structure including a large number of undifferentiated leaf nodes corresponding to text lines, sentences, paragraphs, blocks of text, figures, tables, or so forth.

A table of contents detector 20 analyzes the converted document to extract table of contents information therefrom. Some suitable table of contents extraction algorithms are disclosed in "Method and Apparatus for Detecting a Table of Contents and Reference determination (Xerox ID 20040274-US-NP, Ser. No. 11/032,814 filed Jan. 10, 2005), which is herein incorporated by reference. The output of the table of contents detector 20 is a document 22 organized as a plurality of nodes (such as chapter headings, section headings, figure captions, table captions, or so forth) associated with a table of contents. However, the table of contents extracted by the table of contents detector 20 is "flat" in that the hierarchal structure of the table of contents is not reconstructed.

Figure 2:
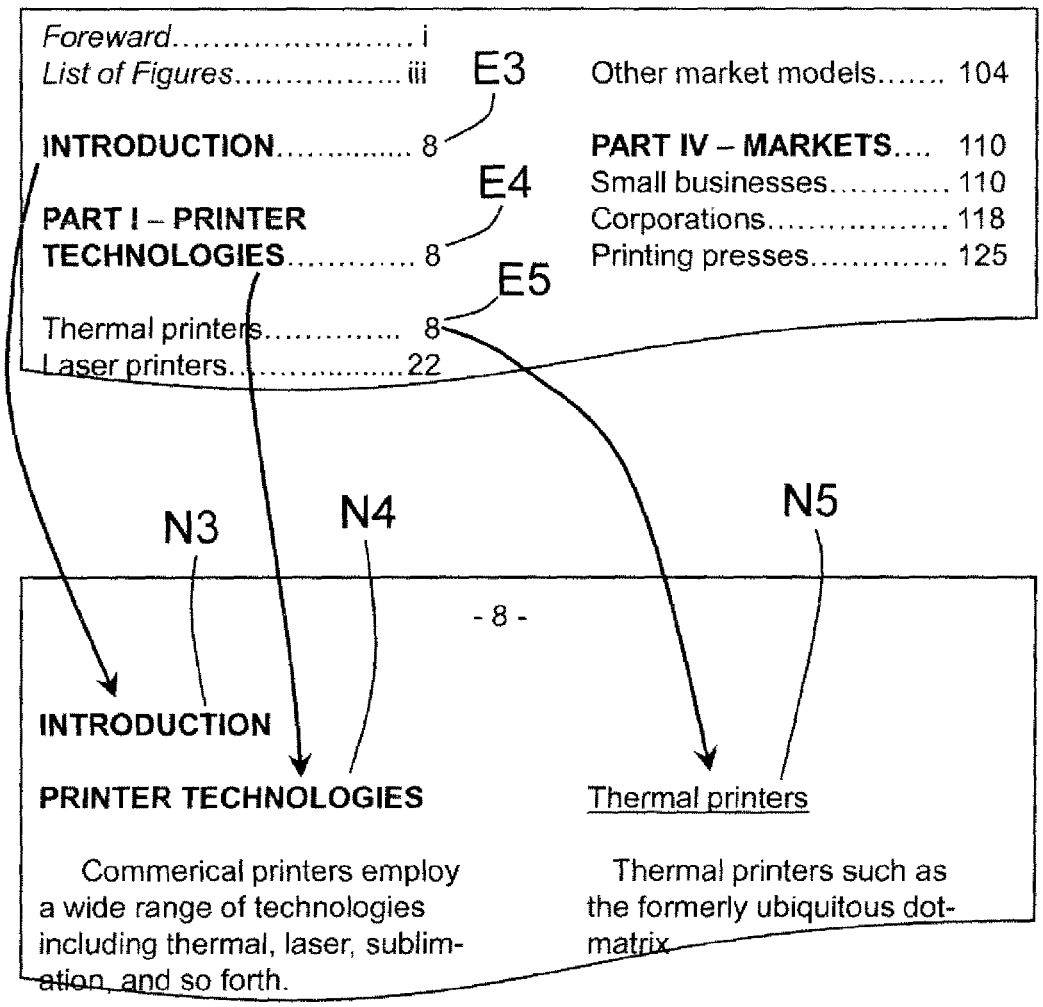
FIG. 2 shows a portion of an example document organized as a plurality of nodes associated with a table of contents.

FIG. 2 shows a portion of an example table of contents. A table of contents page portion shows a top part of a page of the table of contents with three table of contents entries E3, E4, and E5 labeled. Below this in FIG. 2, a page portion shows a top part of "page 8" of the document with contains three corresponding labeled nodes N3, N4, and N5 associated with the table of contents. The node N3 corresponds with the table of contents entry E3; the node N4 corresponds with the table of contents entry E4; node N5 corresponds with the table of contents entry E5. The example table of contents includes many other entries, some of which are shown but not labeled in FIG. 2, and each table of contents entry corresponds with a corresponding node of the document (only nodes N3, N4, and N5 are illustrated in the partial document view of FIG. 2). The document 22 output by the table of contents detector 20 includes the extracted table of contents information without hierarchal information. For example, the output of the table of contents detector 20 is suitably represented as: {(N1, E1), (N2, E2), (N3, E3), (N4, E4), . . . } where N1, N2, N3, . . . are the nodes and E1, E2, E3, . . . are the corresponding table of contents entries. Alternatively, the table of contents entries can be discarded, so that the table of contents information is represented as: {N1, N2, N3, . . . } without retaining the corresponding table of contents entries E1, E2, E3, . . . . The table of contents extracted by the detector 20 does not include hierarchal information. A human reader may readily recognize that, for example, the node N4 having the heading "PRINTER TECHNOLOGIES" in boldfaced capital letters is at a higher level node in the table of contents than the node N5 having the lowercase "Thermal printers" heading. However, this hierarchal information is not extracted by the table of contents detector 20.

With returning reference to FIG. 1, to reconstruct the table of contents hierarchy, a table of contents hierarchy processor 30 analyzes the "flat" table of contents extracted by the table of contents detector 20 to reconstruct the table of contents hierarchy information 32. This hierarchal information is optionally validated by a table of contents validation processor 34 to validate the table of contents. If the validation fails, a remediation 36 is performed, such as taking a corrective action or sending a warning or exception to a human user or parent program. The table of contents hierarchy information 32 is used by a high level document structuring processor 40 to structure the document 22 at a higher level to produce an XML document 42 with high level structure. For example, with brief returning reference to FIG. 2, the highly structured XML document 42 may include nested or tree-based structure in which the higher level "PRINTER TECHNOLOGIES" node N4 contains or is parent to lower level nodes such as "Thermal printers" N5, "Laser printers", and so forth.

In some suitable embodiments, the table of contents hierarchy processor 30 analyzes the table of contents by clustering the nodes of the table of contents into a plurality of clusters based on a similarity criterion, identifying one of the clusters as corresponding to a highest or lowest level of the table of contents based on a selection criterion, assigning the highest or lowest level to the nodes belonging to the identified cluster, and repeating the identifying and assigning to assign levels to the nodes belonging to each next highest or lowest level of the table of contents. In each repetition, the nodes that have already been assigned a level are ignored.

Figure 3:
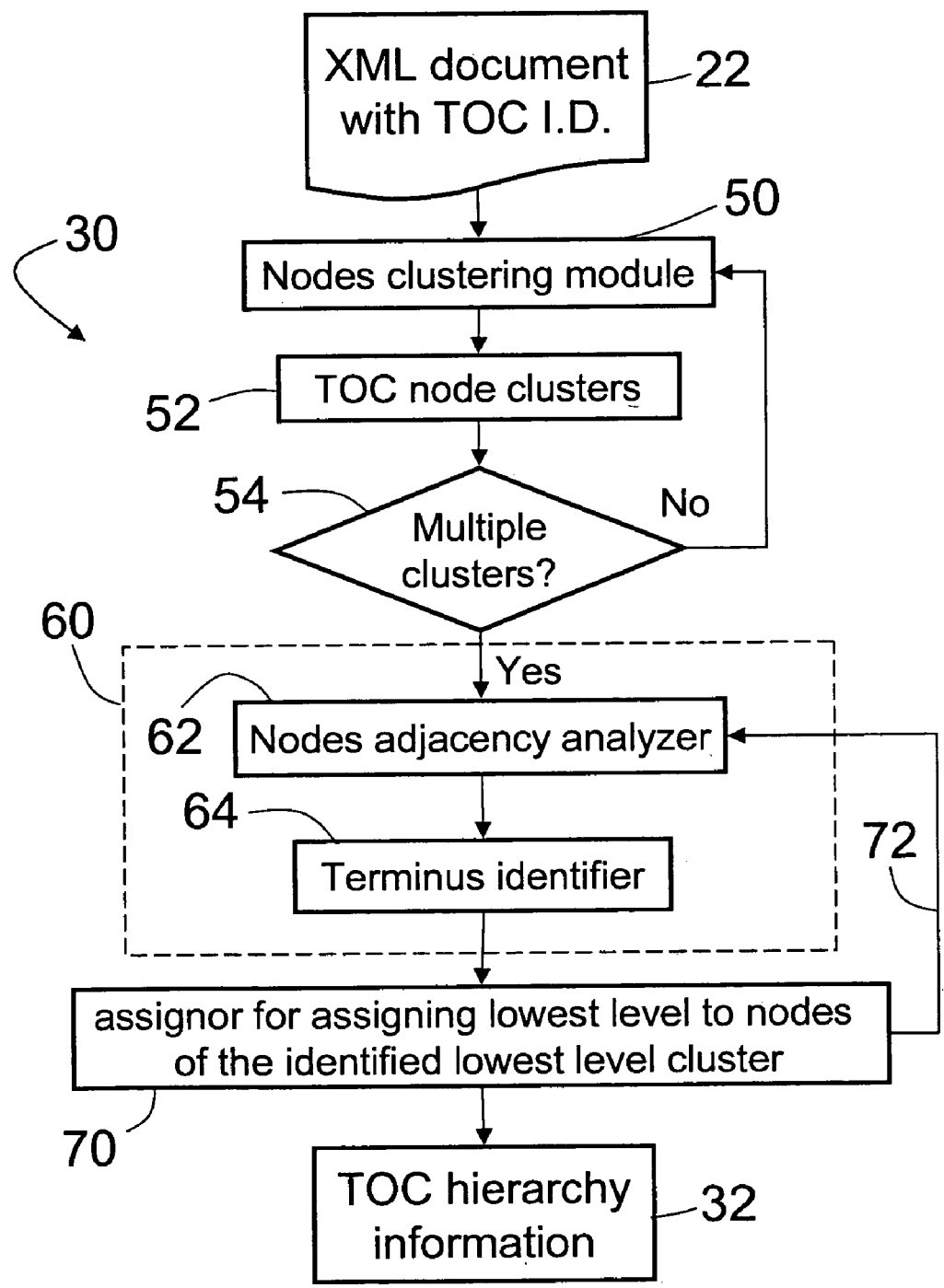
FIG. 3 diagrammatically shows the table of contents hierarchy processor of the documents structuring system of FIG. 1.

With reference to FIG. 3, a nodes clustering module 50 clusters the nodes based on a suitable similarity criterion. The clustering employs a similarity criterion defined by a combination of one or more criteria. For example, suitable clustering criteria can include: font characteristics of associated table of contents entries; font characteristics of headings of the nodes; indentation of associated table of contents entries; indentation of headings of the nodes; level indicative symbols included in associated table of contents entries; level indicative symbols included in headings of the nodes; lexical or semantic analysis of associated table of contents entries; lexical or semantic analysis of nodes; or so forth, and various combinations thereof. In some embodiments, the similarity criterion is constructed from a set of potential component criteria based on availability of the relevant characteristics in the XML document 22. For example, font characteristics can be used if the XML document 22 retains font information and if the table of contents entries have differentiating font characteristics (for example, capitalized chapter headings, bold-faced section headings, and italicized sub-section headings). On the other hand, if the XML document 22 does not have such differentiating font characteristics in the table of contents, other component criteria can be employed. More generally, the similarity criterion is defined by a combination of one or more criteria operating on the nodes, on the corresponding entries of the table of contents, or both.

The nodes clustering module 50 outputs a plurality of clusters each containing one or more nodes. Optionally, a check 54 is performed on the plurality of clusters to ensure that the clustering is appropriate. For example, the check 54 may repeat the clustering based on a revised similarity criterion if the plurality of clusters includes a cluster containing only a single node, since a table of contents hierarchy is unlikely to have a level consisting of a single entry. If one or more clusters have only a single node, then the revised similarity criterion should be relaxed compared with the original similarity criterion so as to produce larger groupings. For example, if the original similarity criterion included a conjunctive combination of both font characteristics and indentation, a revised similarity criterion may consider only font characteristics. Since layout for a given level of a table of contents is usually substantially homogenous, the clustering module 50 usually outputs a plurality of clusters in which the nodes of each cluster correspond to a structural level.

A terminal level cluster identifier 60 identifies one of the clusters as corresponding to a highest or lowest level of the table of contents based on a selection criterion. In the embodiment of FIG. 3, the terminal level cluster identifier 60 identifies a terminal level using a nodes adjacency analyzer 62 that characterizes each cluster by an adjacency ratio given by a ratio of (i) a number of nodes of the cluster having a neighboring node belonging to the same cluster and (ii) a total number of nodes in the cluster. A terminus identifier 64 identifies the cluster having the highest adjacency ratio as corresponding to the lowest level of the table of contents. An assignor 70 assigns the lowest hierarchal level to the nodes belonging to the identified cluster. An iterator 72 iteratively applies the terminal level cluster identifier 60 and the assignor 70 to assign levels to the nodes belonging to each next highest or lowest level of the table of contents. The iterating is based on the selection criteria being applied disregarding or ignoring nodes that have already been assigned a level.

Figure 4:
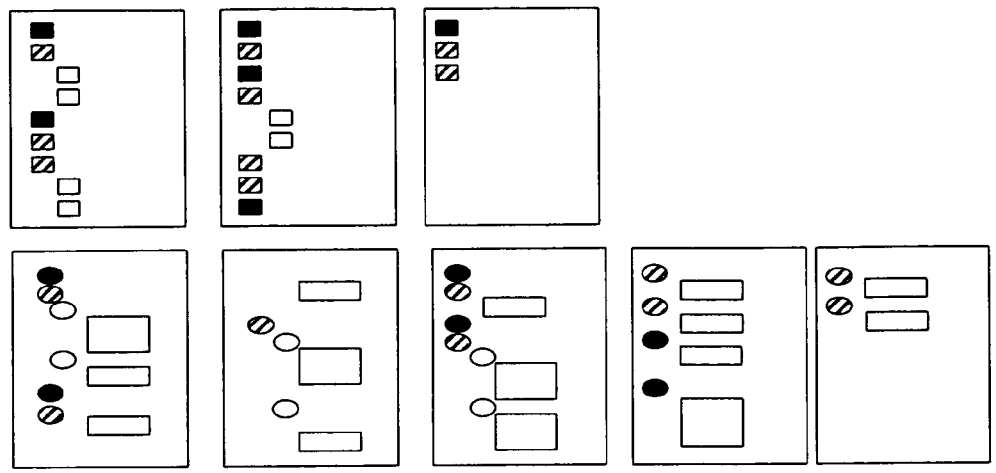
FIG. 4 diagrammatically shows a document organized as a plurality of nodes associated with a table of contents.
Figure 5A:
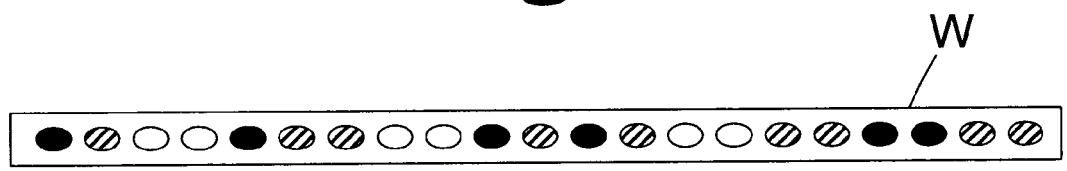
FIG. 5A diagrammatically shows the table of contents of the document of FIG. 4 as a "flat" table of contents with levels combined as clusters but with no hierarchal relationship between the clusters yet established.

With reference to FIG. 4 and FIGS. 5A, 5B, and 5C, operation of the table of contents hierarchy processor 30 of FIG. 3 is illustrated. An example document is shown in FIG. 4. The table of contents spans the top three pages diagrammatically shown in FIG. 4. Each table of contents entry is indicated by a filled box, partially filled box, or open box. Top-level entries are indicated by filled boxes, second-level entries are indicated by partially filled boxes, and lowest level entries are indicated by open boxes. The corresponding five document pages are the bottom five pages diagrammatically shown in FIG. 4. Nodes corresponding to the top-level entries of the table of contents are indicated by filled ovals; nodes corresponding to the second-level entries of the table of contents are indicated by partially filled ovals; nodes corresponding to the lowest-level entries of the table of contents are indicated by open ovals. FIG. 5A shows the "flat" table of contents output by the table of contents detector 20 and processed by the nodes clustering module 50. The clustering suitably identifies three node clusters corresponding to the top level, second level, and lowest levels of the table of contents. However, clustering by itself does not identify the hierarchal levels of these clusters. Accordingly, the clusters in FIG. 5A are shown at a constant or "flat" level.

The first pass of the terminal level identifier 60 analyzes all the nodes, as indicated by including all the nodes in an analysis window W shown in FIG. 5A. Applying the nodes adjacency analysis, the filled ovals cluster have two neighboring nodes that neighbor at least one other node of the filled ovals cluster, and a total of six nodes in the filled ovals cluster, giving an adjacency ratio of 2/6=0.33. For the partially filled ovals cluster, there are six neighboring nodes that neighbor at least one other node of the partially filled ovals cluster, and a total of nine nodes in the partially filled ovals cluster, giving an adjacency ratio of 6/9=0.67. For the open ovals cluster, there are six neighboring nodes that neighbor at least one other node of the open ovals cluster, and a total of six nodes in the open ovals cluster, giving an adjacency ratio of 6/6=1.00. Accordingly, the open ovals cluster is selected by the terminus identifier 64 as corresponding to the lowest level of the table of contents hierarchy, and the nodes indicated by open ovals are assigned to the lowest level.

Figure 5B:
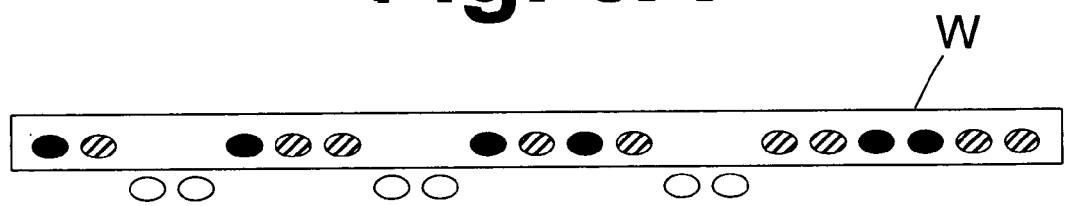
FIG. 5B diagrammatically shows a second iteration of the derivation of the table of contents hierarchy, in which the lowest node level has been assigned to the open oval nodes.
Figure 5C:
FIG. 5C diagrammatically shows a third iteration of the derivation of the table of contents hierarchy, in which the all three node levels have been assigned to the appropriate nodes.

FIG. 5B shows the second iteration pass of the terminal level cluster identifier 60. Because the nodes of the open ovals cluster have already been assigned a level, on the second pass the terminal level identifier 60 applies the selection criterion disregarding or ignoring the nodes of the open ovals cluster. This is diagrammatically indicated in FIG. 5B by moving the nodes of the open ovals cluster below and outside of the analysis window W. Applying the nodes adjacency analyzer 62 with the open ovals cluster ignored, the filled ovals cluster has two neighboring nodes that neighbor at least one other node of the filled ovals cluster, and a total of six nodes in the filled ovals cluster, giving an adjacency ratio of 2/6=0.33. For the partially filled ovals cluster, there are six neighboring nodes that neighbor at least one other node of the partially filled ovals cluster, and a total of nine nodes in the partially filled ovals cluster, giving an adjacency ratio of 7/9=0.78. Accordingly, the partially filled ovals cluster is selected by the terminus identifier 64 as the next-lowest level, and the nodes indicated by partially filled ovals are assigned to the second level. FIG. 5C shows the final result, since the remaining filled ovals cluster is left and hence is assigned the top-level.

Figure 6:
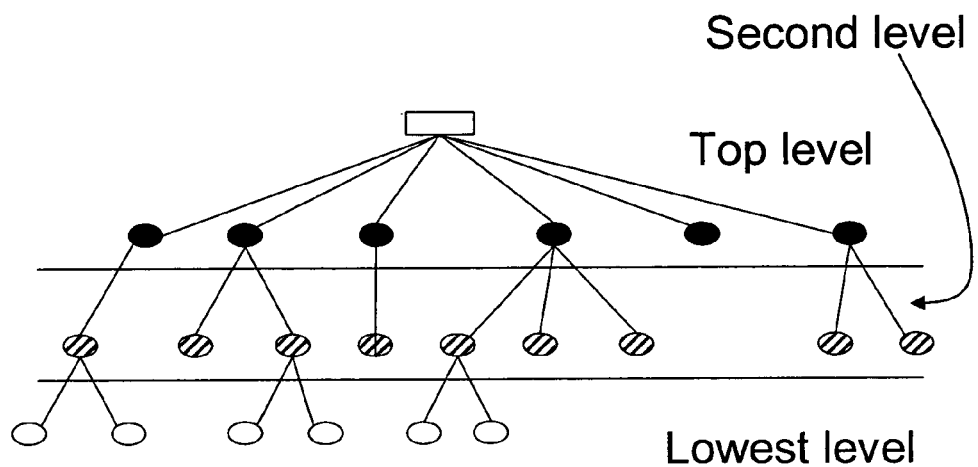
FIG. 6 diagrammatically shows a tree structure for the document of FIG. 4 built based upon the table of contents hierarchy of FIG. 5C.

With returning reference to FIG. 1 and with further reference to FIG. 6, the hierarchy information 32 shown in FIG. 5C for the document shown in FIG. 4 is used by the high level document structuring processor 40 to structure the XML document. For example, FIG. 6 shows a possible tree-based structuring of the document of FIG. 4 generated by the structuring processor 40 based on the table of contents hierarchy information 32 illustrated in FIG. 5C.

Figure 7:
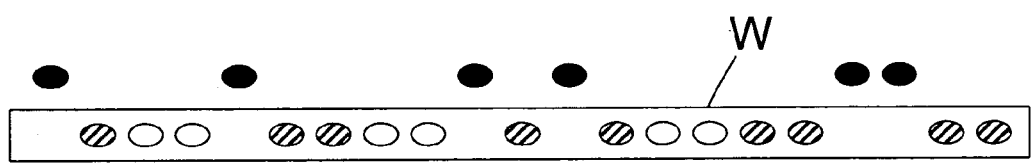
FIG. 7 shows a second iteration of the derivation of the table of contents hierarchy using an alternative terminal level cluster identifier algorithm, in which the top node level has been assigned to the filled oval nodes.

With reference to FIG. 7, the terminal level cluster identifier 60 can use other algorithms to identify the terminal levels. In one alternative approach, the nodes adjacency analyzer 62 is replaced by a different analysis that assumes the first table of contents node in the document is a highest level table of contents node. This identifies the filled ovals cluster as the highest level node cluster. The assignor 70 assigns the top level to the filled oval nodes. The second pass of the terminal level cluster identifier 60 using this algorithm is illustrated in FIG. 7, where the filled oval nodes are ignored (as indicated by moving them outside of the analysis window W). The second pass then identifies the partially filled ovals cluster as the second level, since the first node in the document when the filled ovals are ignored is a partially filled oval node. Thus, in the second pass the assignor 70 assigns the partially filled oval nodes as the second level, leaving the open oval nodes as the lowest level nodes, thus reaching the same result as in FIG. 5C. The skilled artisan can develop other terminal level cluster identification algorithms that can suitably identify lowest or highest level nodes of the table of contents.

Figure 8:
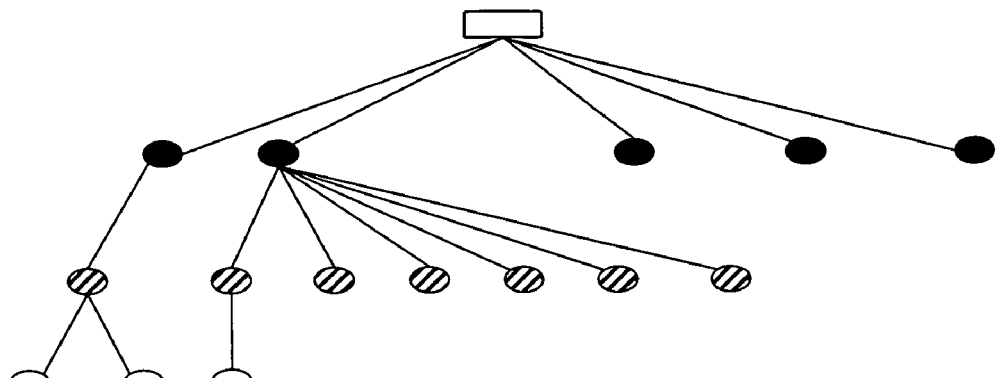
FIG. 8 diagrammatically shows a table of contents hierarchy for which the table of contents hierarchy processor of FIG. 3 produces an erroneous table of contents hierarchy.
Figure 9A:
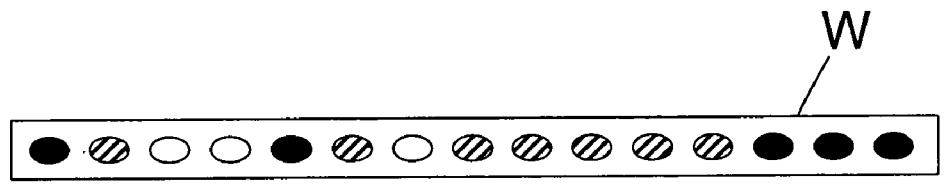
FIG. 9A shows the "flat" table of contents with clustering corresponding to the table of contents of FIG. 8.
Figure 9B:
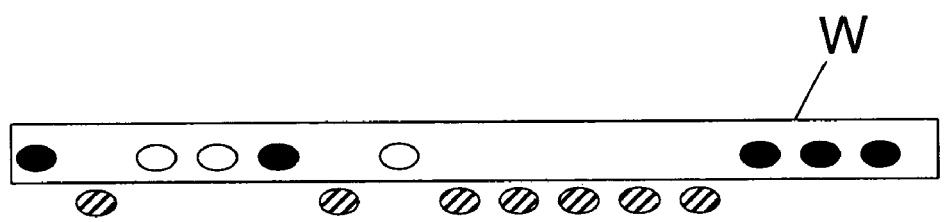
FIGS. 9B and 9C show the derivation of an erroneous table of contents hierarchy from the "flat" table of contents of FIG. 9A. Points where a validation algorithm identifies validation failures are identified in FIG. 9C.

With returning reference to FIG. 1 and with further reference to FIGS. 8 and 9A, 9B, and 9C, the table of contents validation module 34 optionally validates the table of contents hierarchy 32. FIG. 8 shows a table of contents hierarchy for which the table of contents hierarchy processor of FIG. 3 does not work properly. FIG. 9A shows the "flat" table of contents derived by the table of contents detector 20, with the levels clustered by the nodes clustering module 50. Analogously to the symbolism used in FIGS. 4-7, top level nodes are indicated by filled ovals, second level nodes are indicated by partially filled ovals, and lowest level nodes are indicated by open ovals. Applying the adjacency ratio selection criterion to the "flat" and clustered table of contents of FIG. 9A, the filled ovals cluster has an adjacency ratio of $3/5=0.60$, the partially filled ovals cluster has an adjacency ratio of $5/7=0.71$, and the open ovals cluster has an adjacency ratio of $2/3=0.67$. The partially filled ovals cluster is therefore erroneously identified as the lowest level, and are removed from the analysis window W as shown in FIG. 9B. Repeating the application of the adjacency ratio criterion to the remaining filled and open oval clusters, the filled ovals cluster has an adjacency ratio of $3/5=0.60$, and the open ovals cluster has an adjacency ratio of $2/3=0.67$. Accordingly, the open ovals cluster is selected as the second level, leaving the filled ovals cluster as the top level, giving the final erroneous hierarchy shown in FIG. 9C.

Figure 9C:
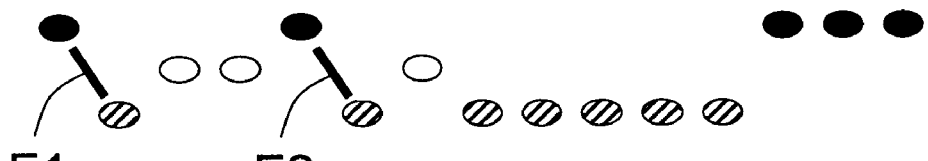

The table of contents validation module 34 detects the erroneous table of contents hierarchy of FIG. 9C. In one suitable embodiment, the validation module 34 determines whether any immediately succeeding node has an assigned level more than one level lower than the assigned level of the previous node. A validation failure is indicated by any succeeding node having an assigned level more than one level lower than the assigned level of the previous node. In the case of the erroneous table of contents hierarchy of FIG. 9C, there are two failures F1, F2, where a succeeding node has an assigned level that is two levels lower than the assigned level of the previous node. Thus, the remediation 36 is performed, which can include various remedial actions such as bypassing the high level structuring, issuing a warning or exception, or so forth. In other embodiments, the validation is done manually, for example through a suitable user interface.

Figure 10A:
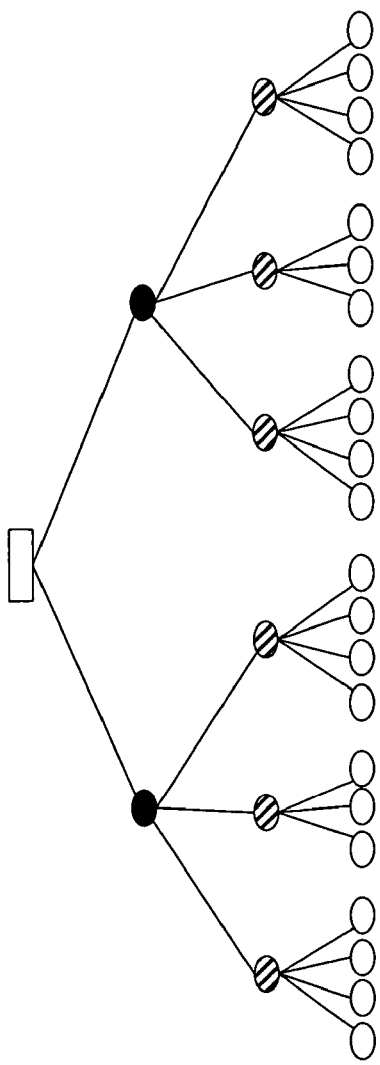
FIG. 10A shows a more typical table of contents hierarchy for which the table of contents hierarchy processor of FIG. 3 produces a correct table of contents hierarchy.
Figure 10B:
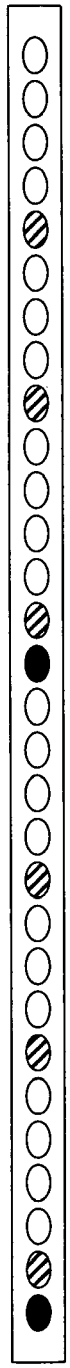
FIG. 10B shows the "flat" table of contents with clustering corresponding to the table of contents of FIG. 10A.
Figure 10C:
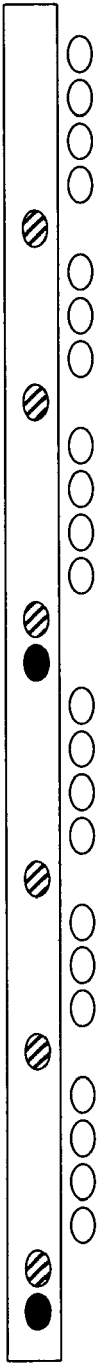
FIG. 10C shows a second iteration of the derivation of the table of contents hierarchy, in which the lowest node level has been correctly assigned to the open oval nodes.

Table of contents hierarchies such as the one diagrammatically shown in FIG. 8 are generally uncommon. FIGS. 10A, 10B, and 10C show a more typical table of contents hierarchy, in which each higher level node has several lower level nodes branching from it. In the "flat" table of contents of FIG. 10B, it is seen that the open oval nodes cluster corresponding to the lowest table of contents level has an adjacency ratio of 1.00 while the two higher level nodes clusters have adjacency ratios of 0.00. This large adjacency ratio difference results because every higher level node has at least one lower level node branching therefrom that intervenes between the higher level nodes to prevent any higher level node from neighboring another higher level node. Moreover, as shown in FIG. 10C, in the second iteration with the lowest level open oval nodes removed, the second level now has an adjacency ratio of 1.00 while the top level node has an adjacency ratio of 0.00. This large adjacency ratio difference results because with the lowest level (open oval) nodes removed, there are no longer any branching nodes intervening between the second level (partially filled oval) nodes, while the highest level (filled oval) nodes continue to have branching second level nodes that interfere with the adjacency.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for reconstructing a table of contents hierarchy, the method comprising:
    clustering nodes associated with a table of contents into a plurality of flat clusters that are not arranged hierarchically based on a similarity criterion;
    assigning the nodes of each flat cluster to a level of the table of contents corresponding to that flat cluster;
    validating the assigned levels of the nodes; and
    taking a remedial action responsive to a validation failure;
    wherein at least the clustering, assigning, and validating are performed by a processor.

2. The method as set forth in claim 1, wherein the assigning of the nodes of each cluster to a level of the table of contents corresponding to that cluster comprises:
    identifying one of the clusters as corresponding to a highest or lowest level of the table of contents based on a selection criterion;
    assigning the highest or lowest level to the nodes belonging to the identified cluster;
    repeating the identifying and assigning to assign levels to the nodes belonging to each next highest or lowest level of the table of contents, the repeated identifying being based on the selection criteria applied disregarding nodes that have already been assigned a level.

3. The method as set forth in claim 1, wherein the validating comprises:
    determining whether any immediately succeeding node has an assigned level more than one level lower than the assigned level of the previous node, a validation failure being indicated by any succeeding node having an assigned level more than one level lower than the assigned level of the previous node.

4. The method as set forth in claim 1, further comprising:
repeating the clustering based on a revised similarity criterion conditional upon the plurality of clusters including a cluster containing only a single node.

5. The method as set forth in claim 1, further comprising:
conditional upon successful validation, structuring the document based at least in part on the levels assigned to the table of contents nodes.

6. A method for structuring a document, the method comprising:
clustering nodes of the document associated with a table of contents into a plurality of clusters based on a similarity criterion, the plurality of clusters not being arranged hierarchically;
identifying one of the clusters as corresponding to a highest or lowest level of the table of contents based on a selection criterion;
assigning the highest or lowest level to the nodes belonging to the identified cluster;
iteratively applying the identifying and assigning to assign levels to the nodes belonging to each next highest or lowest level of the table of contents, the iterating being based on the selection criteria applied disregarding nodes that have already been assigned a level; and
structuring the document based at least in part on the levels assigned to the table of contents nodes;
wherein the clustering, identifying, assigning, iterating, and structuring are performed by an apparatus including a processor.

7. The method as set forth in claim 6, wherein the similarity criterion is defined by a combination of one or more criteria operating on at least one of (i) the nodes, and (ii) corresponding entries of the table of contents.

8. The method as set forth in claim 6, wherein the identity comprises:
computing for each cluster an adjacency ratio of (i) a number of nodes of the cluster having a neighboring node belonging to the same cluster and (ii) a total number of nodes in the cluster; and
identifying the cluster corresponding to the lowest level of the table of contents as that cluster having the highest adjacency ratio.

9. The method as set forth in claim 6, further comprising:
repeating the nodes clustering using a revised similarity criterion conditional upon one or more of the clusters containing only a single node.

10. The method as set forth in claim 6, further comprising:
converting a source document into the document organized as the plurality of nodes.

11. The method as set forth in claim 10, wherein the source document is in a portable document format (pdf) and the converting converts the source pdf document into an extensible markup language (XML) document.

12. The method as set forth in claim 10, further comprising:
associating nodes of the document with a table of contents of the document.

13. A method for structuring a document organized as a plurality of nodes associated with a table of contents, the method comprising:
clustering the nodes into a plurality of clusters based on a similarity criterion, the clustering producing flat clusters that are not arranged hierarchically;
identifying one of the clusters as corresponding to a highest or lowest level of the table of contents based on a selection criterion;
assigning the highest or lowest level to the nodes belonging to the identified cluster;
repeating the identifying and assigning to assign levels to the nodes belonging to each next highest or lowest level of the table of contents, the repeated identifying being based on the selection criteria applied disregarding nodes that have already been assigned a level; and
structuring the document based at least in part on the levels assigned to the table of contents nodes;
wherein the clustering, identifying, assigning, repeating, and structuring are performed by a processor.

14. The method as set forth in claim 13, wherein the similarity criterion is defined by a combination of one or more criteria selected from a group consisting of:
font characteristics of corresponding table of contents entries,
font characteristics of headings of the nodes,
indentation of corresponding table of contents entries,
indentation of headings of the nodes,
level-indicative symbols included in corresponding table of contents entries,
level-indicative symbols included in headings of the nodes,
lexical or semantic analysis of corresponding table of contents entries, and
lexical or semantic analysis of the nodes.

15. The method as set forth in claim 13, wherein the identifying comprises:
for each cluster, computing an adjacency ratio of (i) a number of nodes of the cluster having a neighboring node belonging to the same cluster and (ii) a total number of nodes in the cluster; and
identifying the cluster corresponding to the lowest level of the table of contents as that cluster having the highest adjacency ratio.

16. The method as set forth in claim 13, wherein the identifying comprises:
for each cluster, computing an adjacency ratio of (i) a number of nodes of the cluster having a neighboring node belonging to the same cluster and (ii) a total number of nodes in the cluster; and
identifying the cluster corresponding to the highest level of the table of contents as that cluster having the lowest adjacency ratio.

17. The method as set forth in claim 13, further comprising:
validating the assigned levels of the nodes; and
taking a remedial action responsive to a validation failure;
wherein at least the validating is performed by a processor.

18. The method as set forth in claim 17, wherein the validating comprises:
determining whether any immediately succeeding node has an assigned level more than one level lower than the assigned level of the previous node, a validation failure being indicated by any succeeding node having an assigned level more than one level lower than the assigned level of the previous node.

19. The method as set forth in claim 13, wherein the structuring of the document based at least in part on the levels assigned to the table of contents nodes comprises:
generating a tree-based structuring of the document based on the levels assigned to the table of contents nodes.

* * * * *